May 28, 1957 E. B. MOORE ET AL 2,794,103
TEMPERATURE SELECTOR SWITCH
Filed March 4, 1953 2 Sheets-Sheet 1
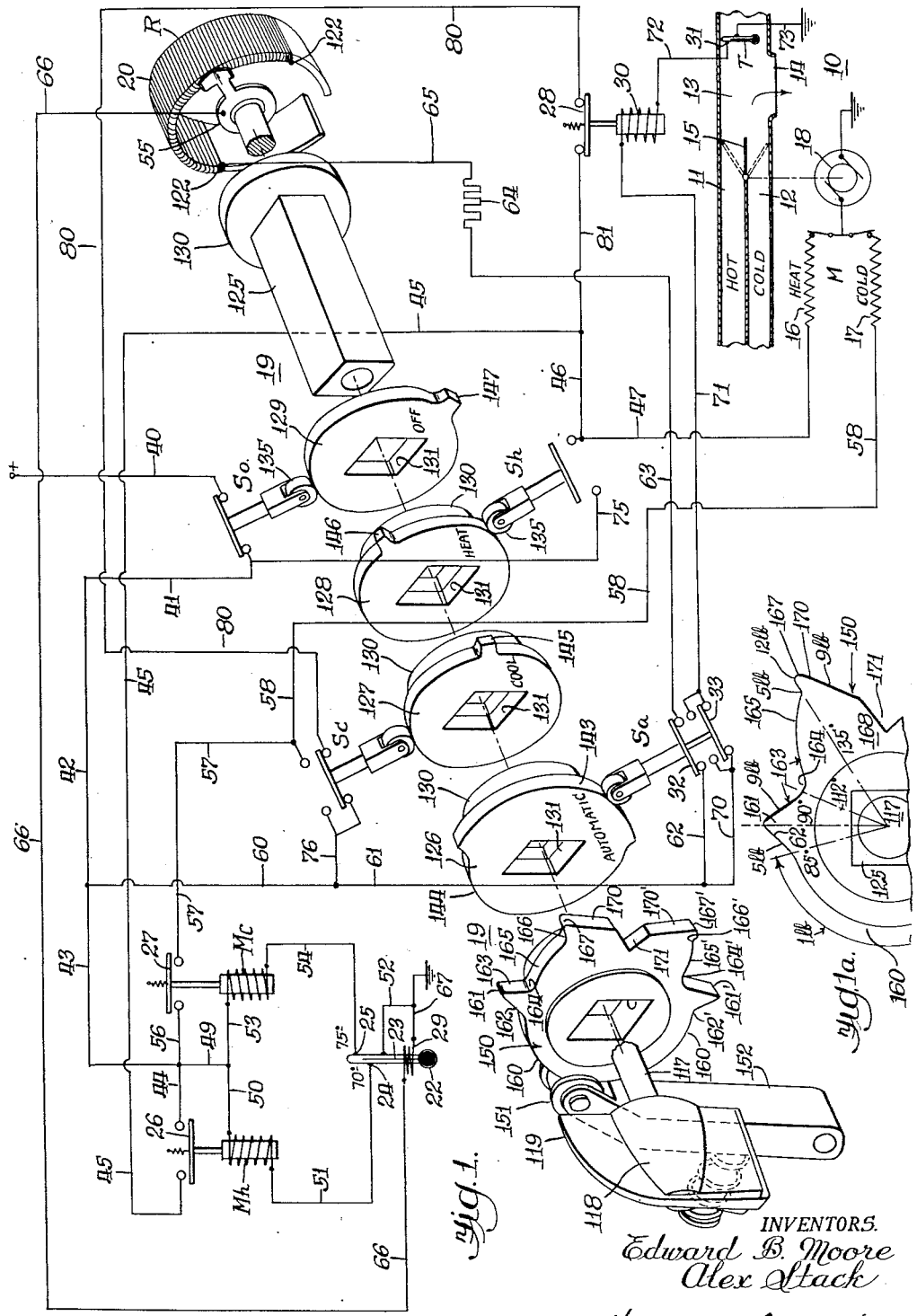
INVENTORS.
Edward B. Moore
Alex Stack
By Harvey M. Gillespie Atty.

May 28, 1957 E. B. MOORE ET AL 2,794,103
TEMPERATURE SELECTOR SWITCH
Filed March 4, 1953 2 Sheets-Sheet 2
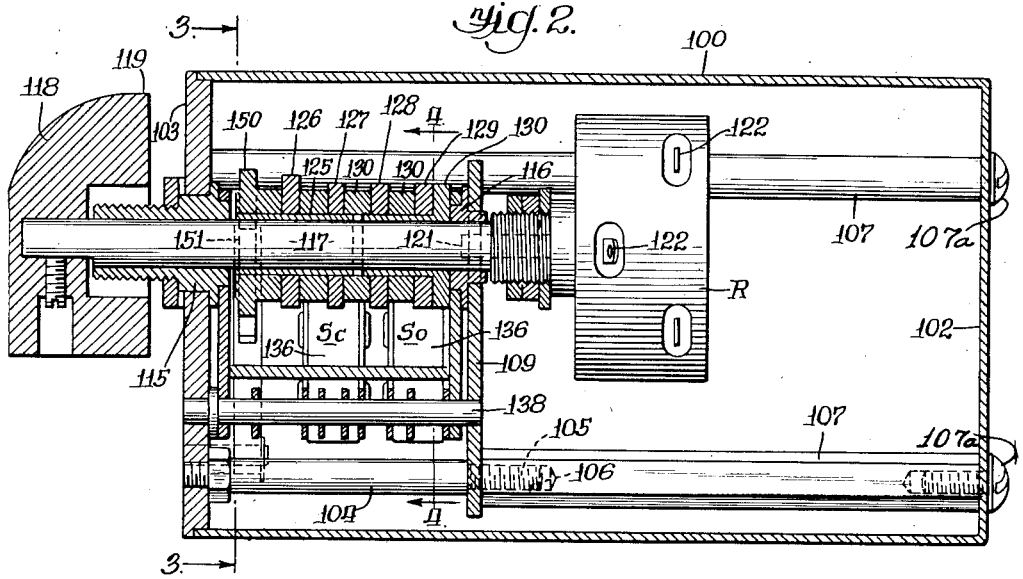
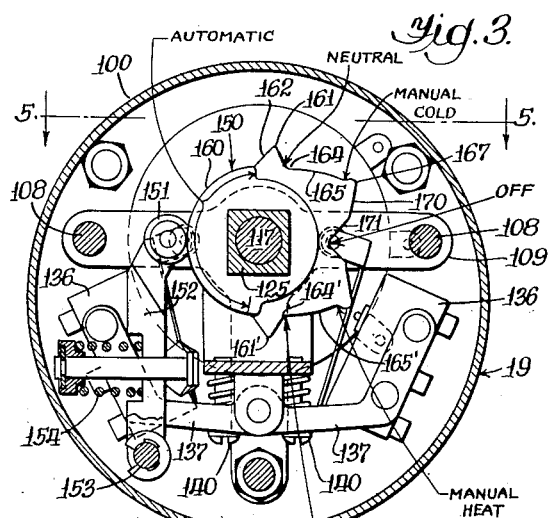
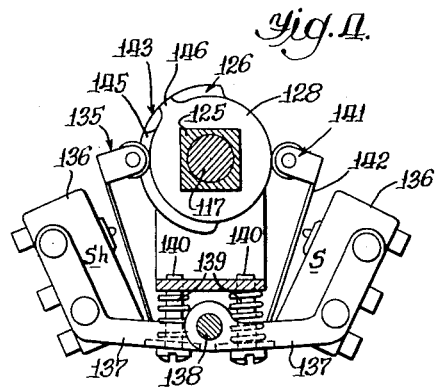
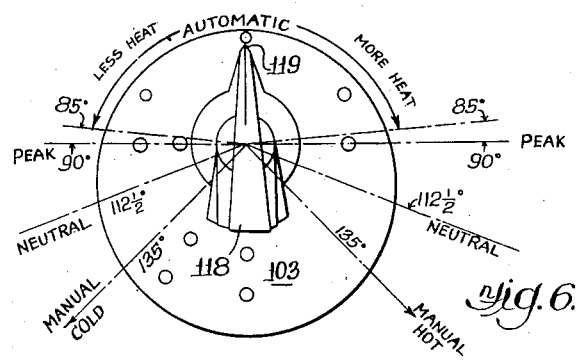
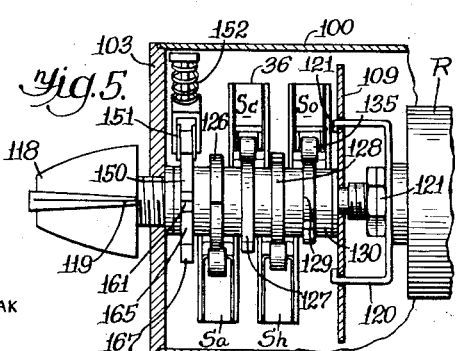
INVENTORS.
Edward A. Moore
Alex Hack
By Harvey M. Gillespie Atty.

United States Patent Office 2,794,103
Patented May 28, 1957

2,794,103

TEMPERATURE SELECTOR SWITCH

Edward B. Moore, La Grange Park, and Alex Stack, Berwyn, Ill., assignors to Vapor Heating Corporation, Chicago, Ill., a corporation of Delaware Application March 4, 1953, Serial No. 340,218

7 Claims. (Cl. 201—55)

This invention relates to temperature selector switches and has to do particularly with the provision of an improved switch of the above class which is particularly suitable for use in connection with the temperature control systems of aircraft, highway buses and the like.

It is frequently desirable, in temperature control systems of the above class, to adjust the control elements of the system so as to compensate for abrupt changes in the heating and cooling requirements, for example abrupt changes in altitude of an aircraft or the various conditions encountered in the operation of highway buses and similar vehicles. It is also desirable that these adjustments be made by the pilot or operator of the vehicle, with a minimum of effort or concentration on his part and without being obliged to visually regard the instrument operated to obtain the desired temperature adjustment.

The improved selector switch of this invention has, for illustrative purposes, been shown in connection with one specific form of temperature control system wherein a proportioning valve or damper is selectively moved between two extreme positions for the purpose of blending varying amounts of heated and unheated air prior to conduction thereof into the cabin or compartment of an aircraft. In such an installation the selector switch has been electrically connected to the various control circuits of the system so that certain predetermined circuit opening and circuit closing functions will be accomplished at the will of the operator to carry out the functions peculiar to the particular system. It will be understood however that the selector switch, as illustrated, may be electrically connected in other systems for circuit opening and circuit closing purposes to accomplish similar or different functions and it will also be understood that the switch is susceptible to modification so that it may control the operation of a greater or lesser number of circuits, utilizing a greater or lesser number of switch positions.

The temperature control system involves in its general organization a proportioning valve or damper for regularly blending hot and cold air prior to introduction of the blended air stream into the enclosure whose temperature is being controlled. A reversible electric motor for actuating the damper is under the control of certain relay circuits which are capable of being opened or closed either manually or under the control of a thermostat positioned within the enclosure. The selector switch associated with the system is provided with a control knob capable of manipulation by an operator. The control knob is movable through a relatively wide angular range of movement, for example 170° and within this angular range the system will be conditioned for automatic operation under the control of the thermostat. The particular positioning of the knob within this angular range will determine the effective control limits of the thermostat, clockwise movement of the knob resulting in higher effective thermostat setting to increase the proportion of hot air in the blended air stream and counterclockwise movement of the knob resulting in a lower effective thermostat setting. Beyond this "automatic" range of adjustment in either direction is a neutral position of the knob wherein the automatic control is disabled and wherein the circuit for the damper-controlling motor is interrupted so as to leave the damper static in the position it assumed immediately prior to movement of the knob to either neutral position.

Beyond one of these two neutral positions of the control knob is a position of maximum heat and when the knob is moved to this position all other controls are overridden and the damper is moved to its extreme position wherein the admission of cold air to the blended stream is effectively blocked. Beyond the other neutral position of the control knob is a position of maximum cold air and when the knob is moved to this latter position all other controls are overridden and the damper is moved to its other extreme position wherein the admission of hot air to the blended stream is effectively blocked. Finally, beyond either of the neutral positions of the control knob, and midway between them, is an "off" position wherein the entire control system is incapacitated.

In order that the operator, for example an aircraft pilot, may give his undivided attention to his instrument panel, the selector switch is so constructed that he may have sensory control over manipulation of this instrument. Thus, when the control knob is in the automatic range of adjustment one pound of torque application to the knob in either direction will suffice to allow movement of the knob. Thus if the knob responds to movement in either direction with relative ease, the pilot will know that the knob is somewhere within the automatic range. Movement of the control knob out of the automatic range in either direction to locate the same in either neutral position will require a five pound application of torque. Upon such application of torque the knob will snap into the desired neutral position. Furthermore, the control knob, having been moved to either of its neutral positions will be biased in this position so that further movement of the knob toward either the position of maximum cold or maximum hot air will require continued manual application of increased torque to the control knob.

The positions of maximum hot and cold air are thus unstable positions and upon release of the knob at either of these positions the same will return to its adjacent neutral position. The torque requirement for moving the knob from either neutral position toward the maximum hot air or maximum cold air positions is nine pounds of applied manual force but when either of these latter positions is attained the torque requirement is relieved so that a force of only five pounds by the fingers of the pilot will suffice to maintain the knob in either of these positions. This will prevent undue tiring of the fingers if the knob is to be held in either of these positions for any great length of time.

Movement of the control knob past either the maximum hot air or the maximum cold air positions to the "off" position, in one direction or the other as the same may be, will require a torque effort of twelve pounds and when this has been exceeded the knob will snap to the "off" position under a spring load of nine pounds. Thus to again move the knob away from its "off" position in either direction will require a nine pound torque effort.

The control knob is capable of 360° movement in either direction from any one position to any other position at will and the movements of the knob at any time may be recognized through the sense of "feel" so that the pilot will, during any particular manipulation of the knob, be apprised of its position and range of movement.

The provision of a selector switch for use in a temperature control system of the character briefly outlined above being among the principal objects of the present invention, numerous other objects and advantages thereof will become more readily apparent as the nature of the invention is better understood.

A preferred embodiment of the invention is illustrated in the accompanying drawings, wherein:

Fig. 1 is an exploded view of a selector switch constructed in accordance with the principles of the present invention, showing the same operatively applied to a temperature control system which has been illustrated in wiring diagram form, the entire disclosure being largely schematic in its representation.

Fig. 1a is a plan view of a torque cam employed in connection with the selector switch of Fig. 1, the torque characteristics of the cam being legended by suitable indicia.

Fig. 2 is a sectional view taken substantially longitudinally and centrally through the assembled selector switch of Fig. 1.

Fig. 3 is a sectional view taken substantially along the line 3—3 of Fig. 2.

Fig. 4 is a sectional view taken substantially along the line 4—4 of Fig. 2.

Fig. 5 is a sectional view taken substantially along the line 5—5 of Fig. 3, and Fig. 6 is a front elevational view of the selector switch with the various control knob positions thereof indicated by suitable legends.

Referring to the drawings, and in particuular to Fig. 1, the control system of the present invention is diagrammatically shown as being applied to the regulation of the temperature within an enclosure at a region designated at 10 and which may be the passenger or other compartment of an aircraft, bus or the like. Hot and cold air issuing from conduits 11 and 12 respectively is adapted to be blended into a single stream at 13 and discharged into the compartment through a series of ports 14, the proportion of hot and cold air being regulated under the control of an adjustable damper 15 movable between the two dotted line positions shown. The movements of the damper 15 are regulated by an electric motor M of the reversible type having field windings 16 and 17, the former, when energized, serving to cause movement of the armature 18 in a direction to swing the damper 15 in a counterclockwise direction to reduce the amount of hot air issuing from the conduit 11 and the latter, when energized, serving to cause movement of the damper in a direction to reduce the amount of cold air issuing from the duct 12.

The circuits for each of the windings 16 and 17 are adapted to be opened or closed manually or automatically, as desired, all under the control of a selector switch assembly designated in its entirety at 19 and somewhat schematically shown in Fig. 1 but shown in detail in Figs. 2 to 6 inclusive.

The details of the selector switch assembly will be set forth subsequently but for an understanding of the assembly it is deemed sufficient to point out that it includes four pairs of cam controlled contact groups or switch units Sa, Sc, Sh and So and a rheostat R having a resistance winding 20.

The switch assembly 19 is capable of being conditioned for automatic operation of the damper 15 under the control of cyclicly operable thermostat 22 having a mercury column 23 and an auxiliary heater 29 surrounding the column 23, the thermostat being suitably positioned within the enclosure 10. The thermostat is provided with a pair of contacts 24 and 25. The contact 24 is adapted to be engaged by the column 23 when a predetermined minimum ambient temperature, say 70° F. is attained within the compartment, while the contact 25 is adapted to be engaged when a predetermined higher temperature, say 75° F. is reached. The automatically operable portion of the control system further includes a relay Mh provided with a normally closed contact 26 and a relay Mc provided with a normally open contact 27. A normally closed limit switch 28, operable under the control of relay 30, constitutes an additional relay instrumentality associated with the system. The relay 30 is disposed in a circuit in series with a pair of contacts 31 associated with a limit thermostat T disposed in the blended air stream 13 issuing from the conduits 11 and 12.

The switch Sa is provided with simultaneously operable contacts 32 and 33. The contact 33 is always in a position whereby the switch 28 will be energized open when the temperature in the delivery duct 13 is sufficient to close the duct thermostat T. Under such condition, the closing of contact 32 of switch Sa establishes a circuit for automatic operation of the damper 15. This circuit leads through positive lead 40, switch So, leads 41, 42, 43, 44, switch 26 (normally closed), leads 45, 46, 47, winding 16 of the motor M and armature 18 to ground. The damper 15 will thus be moved in a clockwise direction as viewed in Fig. 1 to decrease the flow of cold air issuing from the conduit 12, and thereby increase the effectiveness of the hot air delivered from conduit 11.

As soon as the temperature of the compartment rises to the predetermined minimum of 70° F., the contact 24 of the thermostat 22 will be engaged by the column 23 to establish a circuit through the relay Mh to open its contact 26. This circuit extends from the positive side of the line, through lead 40, switch So, leads 41, 42, 43, 49, 50, relay coil Mh, lead 51, contact 24, and lead 52 to ground. Such energization of the relay Mh will cause opening of the relay contact 26 and thereby open the circuit through the field winding 16 of the motor M so as to stop the operation of the motor and the damper 15.

If the temperature within the enclosure 10 continues to rise so that the maximum temperature for which the thermostat 22 is set, namely 75° F., is attained, the contact 25 will be engaged by the mercury column 23 to establish a circuit through the relay Mc. This latter circuit extends from the positive side of the line, through lead 40, switch So, leads 41, 42, 43, 49, 53, relay coil Mc, lead 54, contact 25, column 23, and lead 52 to ground. Such energization of the relay Mc will close its contact 27 and establish a circuit from the positive side of the line, through lead 40, switch So, leads 41, 42, 43, 56, contact 27, leads 57, 58, field winding 17 of the motor M and armature 18 to ground. Energization of this latter circuit will cause the damper 15 to be moved in a counter-clockwise direction from its previous position and thereby increase the flow of cold air from conduit 12 into the blended stream 13 and thereby reduce the effectiveness of the hot air delivered from conduit 11.

Still considering the automatic control condition of the system, the effective setting of the thermostat 22 is regulated by the setting of the variable resistor R. The resistor R is provided with a movable sliding contact arm 55 which, when moved in a counter-clockwise direction as seen in Fig. 1, allows increased current to flow in the resistor circuit. Conversely, the arm 55, when moved in a clockwise direction, decreases the current flow in the resistor circuit. The resistor R is disposed in series with the auxiliary heater 29 of the thermostat 22, the circuit extending from the positive side of the line, through lead 40, switch So, leads 41, 42, 60, 61, 62, contacts 32 of the switch Sa, lead 63, current limiting resistor 64, lead 65, resistance 20, lead 66, heater 29, and lead 67 to ground.

From the above description it will be seen that the further to the left the contact arm 55 is moved, the greater will be the current flowing in the resistor circuit including the auxiliary heater 29 and the greater will be the heat radiated to the mercury column so that the column will rise in excess of its normal reading and tend to maintain the contacts 24 or 25 (as the case may be) engaged by the mercury column 23 at a lower temperature than would be the case when a current of less volume passes through resistor R. As a consequence, the energization of the motor winding 16 will be effected at a corresponding lower ambient temperature within the compartment 10. The converse is true when the sliding arm 55 of the resistor R is moved in a clockwise direction and energization of the winding 16 will take place at a correspondingly higher ambient temperature.

During either automatic or manual control of the damper 15 as described above, and as long as the temperature of the blended air stream 13 remains above a predetermined minimum which may be 90° F., a circuit will be established from the positive side of the line, through lead 40, switch So, leads 41, 42, 60, 61, 70, contacts 33, lead 71, relay 30, lead 72, contacts 31 and lead 73 to ground. Energization of the relay 30 will maintain the relay contact 28 open. However, if at any time the temperature of the blended air stream 13 falls below the predetermined minimum, the thermostat contacts 31 will be opened and the relay contact 28 will close to establish a circuit extending to the Motor M, through lead 40, switch So, leads 41, 42, 60, 76, switch Sc, lead 80, switch 28, leads 81, 46, 47, and winding 16, to ground. Energization of this latter circuit will thus energize the motor in a direction to move the damper 15 to its position of maximum heat. This circuit will overrule the other control circuits until such time as the temperature of the blended stream 13 rises above the temperature setting of the duct thermostat T and the temperature setting of contact 25 of the space thermostat 22.

As will be pointed out hereinafter, the selector switch 19 is so constructed that whenever the switches Sc or Sh are closed, the contacts 32 of the switch Sa will be open and the automatic operation of the system will be disabled. Means are provided whereby the pilot of the aircraft may, at will, manipulate the mechanism to close either the switch Sh or the switch Sc. Closure of the switch Sh will serve to energize the motor field winding 16 and thereby operate the motor M in a direction to move the damper 15 to its extreme position wherein the conduit 12 is effectively blocked and the conduit 11 is wide open. Closure of the switch Sc will move the damper to its other extreme position.

The circuit for manual control of the damper 15 under the influence of closure of the switch Sh extends from the positive side of the line, through lead 40, switch So, lead 75, switch Sh, lead 47, field winding 16 and armature 18 of motor M to ground. With this circuit energized the damper 15 will be moved to its extreme position wherein the flow of cold air from the conduit 12 will be effectively blocked.

A similar circuit exists for manual control of the damper under the influence of closure of the switch Sc. This circuit extends from the positive side of the line, through lead 40, switch So, leads 41, 42, 60, 76, switch Sc, lead 58, field winding 17 and armature 18 of motor M to ground.

The switch assembly 19 is capable of manipulation so as to open the switch So and disable the entire temperature control system. Obviously from an inspection of Fig. 1 it will be seen that with the switch So open, no current can enter the system from the main line 40.

*The selector switch assembly 19*

Referring now to Figs. 2 to 6 inclusive, the selector switch 19 which was schematically illustrated in Fig. 1 is shown in detail in these latter views. The switch involves in its general organization an outer shell or casing 100 including a cylindrical cup shaped portion having an integral rear wall 102. The switch chassis includes a front panel 103 of circular design which fits within the open end of the shell 100 and which is held in position by means of longitudinally extending supporting struts or tie rods 104 of which there are three in number. The tie rods 104 have threaded ends 105 which are received in sockets 106 provided in extensions 107, the rear ends of which are secured to the rear wall 102 by means of anchoring screws 107a. A three-arm spider 109 has one arm clamped between the adjacent ends of one tie rod 104 and its extension 107. The other two arms of the spider are supported by means of longitudinal struts 108 extending between the panel 103 and spider 109.

Rotatably mounted in a bushing 115 carried by the panel 103 and in a bushing 116 carried by the spider 109 is the switch operating shaft 117. The shaft 117 projects forwardly of the panel 103 and bushing 115 and carries at its forward end a control knob 118 of conventional design and so shaped as to provide an indicating pointer 119.

The previously mentioned resistor R is in the form of a more or less conventional potentiometer which is anchored to a bracket 120 (Figs. 1 and 5) mounted on the spider 109 and the operating shaft 117 is recessed to drivingly receive the end of the potentiometer shaft 121. The potentiometer is provided with the usual terminals 122 of which only two are employed as shown in the circuit diagram of Fig. 1.

Surrounding the medial regions of the shaft 117 is a sleeve member 125 which is square in cross section and which is suitably secured to the shaft for rotation in unison therewith. Positioned on the sleeve member and spaced therealong are a series of four cam disks 126, 127, 128 and 129 (see also Fig. 1) which are separated by spacer washers 130. The cam disks and washers are provided with square openings 131 by means of which they are drivingly mounted on the sleeve member 125.

The cam disk 126 is adapted to control the opening and closing movements of the switch Sa which, as previously described, in turn controls the automatic or non-automatic operation of the temperature control system. The cam disk 127 controls the opening and closing movements of the switch Sc which effects movement of the damper 15 to its extreme counterclockwise position to effectively block the flow of heated air into the blended air stream 13. The cam disk 128 controls the opening and closing movements of the switch Sh which effects movement of the damper 15 to its extreme clockwise position to block the flow of cold air into the air stream 13. The cam disk 129 controls the opening and closing movements of the switch So which, when open, disconnects the supply of current to the control system as previously set forth.

The various switches Sa, Sh, Sc and So are shown in Fig. 1 as being direct acting, which is to say their respective contacts are shown as being operable under the control of cam followers 135 which ride upon the peripheries of the various cam disks with which they are associated. Actually however, as shown in Figs. 2 and 4, these switches are in the form of microswitches 136 carried on adjustable arms 137 pivoted on a rod 138 and adjustable toward and away from the cam cluster assembly by means of spring 139 and tension adjusting screws 140. The cam followers 135 diagrammatically shown in Fig. 1 are actually in the form of follower rollers 141 carried at the free end of spring arms 142.

The cam disk 126 is formed with a raised portion 143 (Fig. 1) of roughly 170° in extent, this portion, when engaged by the cam followers 135, serving to maintain the contacts 32 and 33 of the switch Sa closed. During manipulation of the control knob 118 through the 170° range legend "automatic" in Fig. 6, the follower 135 will ride upon the raised portion 143 of the cam disk 126 and maintain the automatic control circuits of the system closed as previously described. During such manipulation of the control knob 118 in the automatic range, the sliding contact arm 55 of the resistor R will travel on the resistance winding 20 to control the amount of heat generated by the auxiliary heater 29. The cam disk 126 is also provided with a depressed portion 144 onto which the follower 135 will move when the control knob 118 moves in either direction out of the range legend "automatic" in Fig. 6 and at which time the switch contacts 32 and 33 will become open to discontinue the automatic operation of the control system.

The cam disk 127 is formed with a peripheral elevation or protuberance 145 adapted to move under the follower 135 of the switch Sc when the control knob 118 is moved from the zero position indicated in Fig. 6 counter-clockwise approximately 135°. However, before this position of the knob 118, shaft 117 and cam disk 126 is attained, the various rotating parts of the switch mechanism is adapted to be biased to a neutral position wherein the control knob 118 moves approximately 112½° in a counterclockwise direction from the zero position of Fig. 6. The purpose of this neutral position will be described hereinafter. When, at the 135° position of the control knob 118, the elevation 145 moves under the cam follower 135, the switch Sc becomes closed to establish the previously described circuit through the field winding 17 of the motor M.

The cam disk 128 is formed with a peripheral elevation or protuberance 146 adapted to move under the follower 135 of the switch Sh when the control knob 116 is moved from its zero position clockwise approximately 135°. Such movement of the rotating switch parts is preceded by another neutral position at which the control knob assumes a position approximately 112½° clockwise from its zero position shown in Fig. 6. When the cam protuberance 146 moves beneath the cam follower 135 of the switch Sh, the switch will become closed to establish the previously described circuit through the motor field winding 16 to move the damper 15 to its extreme position wherein the flow of cold air to the airstream 13 is effectively blocked.

The cam disk 129 is formed with a peripheral protuberance 147 adapted to move under the cam follower 135 of the switch So when the control knob 118 is moved approximately 180° in either direction from the zero position indicated in Fig. 5. In this position of the control knob and protuberance 147, the current supply leading from the source is interrupted and the control system remains inoperative as previously described.

Referring now to Figs. 1 and 3, the sleeve 125 has mounted thereon adjacent its forward end a biasing cam 150 which is separated from the adjacent cam disk 126 by means of one of the spacer disks 130. The biasing cam 150 has associated therewith a cam follower 151 in the form of a roller carried at the free end of a follower arm 152 pivoted on a stud 153 (Fig. 3) carried by the panel 103. A spring 154 serves to normally urge the follower arm 152 in a clockwise direction as seen in Fig. 3 so that the follower roller 151 will bear against the periphery of the cam 150.

The cam 150 is symmetrical on opposite sides of a horizontal center line when the cam is in the position shown in Fig. 3 and it is provided with a circular arcuate portion 160 (Fig. 1a) of approximately 170° in extent on which the follower roller 151 is adapted to ride when the control knob 118 moves in its automatic range with the follower 135 of the switch Sa riding on the surface 143 of the cam disk 126.

Still referring to Figs. 1a and 3, the cam 150 is formed with a V-shaped protuberance 161 having sloping sides 162 and 163. The protuberance 161 is adapted to be engaged by the follower roller 151 when the control knob 118 is removed counterclockwise to approximately its 85° position as seen in Fig. 6. At approximately 90°, the roller 151 is adapted to ride over the peak or crest of the protuberance 161 and at approximately 112½° the roller is adapted to move into a position within a trough-like depression 164 (Fig. 1a) wherein the entire moving switch assembly assumes a neutral position as previously described with the contacts 32 and 33 of the switch Sa open and the switches Sc, Sh and So closed. In this biased neutral position, the control knob will assume its 112½° position shown in Fig. 6 and from this position it may be manually moved against the action of the spring 154 (Fig. 3) to a 135° position wherein the protuberance 145 opens the switch Sc. In moving to this 135° position, the follower roller 151 rides outwardly on a generally rounded cam surface 165 (Figs. 1, 1a and 3) and enters a trough portion 166 immediately preceding a crest or peak 167 provided at the outer extremity of the cam surface 165. With the follower roller 151 positioned in the trough portion 166 the protuberance 145 will be positioned beneath the cam follower 135 of the switch Sc but the movable portion of the switch assembly 19 will be biased under the influence of the spring 154 (Fig. 3) in a clockwise direction so that if the control knob 118 is released, the parts will return to the neutral position with the roller 151 resting within the trough 164.

On the side of the crest or peak 167 remote from the trough 166 is an inclined cam surface 170 which terminates in a notch 171 located 180° from the mid-point of the arcuate portion 160. When the follower roller 151 is disposed within the notch 171, the movable cam cluster will be biased in a position wherein the protuberance 147 on the cam disk 129 rides under the follower roller 135 of the switch So to open the latter and disconnect the entire control system from the current supply. At such time the control knob 118 will be in the "off" position indicated in Fig. 6.

The biasing cam 150 is so designed that the pilot may, by his sense of feel, be apprised of the position of the movable cam cluster, i. e. the operative position of the switch assembly 19, whenever he engages the knob 118 and attempts to rotate the same in one direction or the other. Stated otherwise, the biasing cam 150 applies torque resistance characteristics to the operating shaft 117 which are recognizable by the pilot upon manipulation of the knob. Accordingly, as seen in Fig. 1a, the anti-friction characteristics of the follower roller 151, coupled with the rate of the spring 154 (Fig. 3) will permit movement of the roller 151 on the arcuate portion 160 of the biasing cam under the influence of one pound of applied torque in either direction.

Movement of the roller 151 outwardly on the sloping surface 162 will require application of five pounds of torque to the control knob 118 in a counter-clockwise direction. Thus, to bring the cam cluster to its neutral position with the follower roller 151 resting within the trough 164 five pounds of torque must be applied to the control knob 118.

The cam surface 165 is generally rounded as shown in Fig. 1a so that it requires nine pounds of applied torque to move the control knob 118 to bring the roller 151 into the trough portion 166 from the trough portion 164 but it only requires five pounds of applied torque to maintain the roller positioned within this latter trough portion. The net effect of this is that in moving the cam cluster from the neutral position to the position wherein the switch Sc will be closed to discontinue the supply of heated air at the damper 15, nine pounds of torque must be applied to the control knob 118 but only five pounds of applied torque will suffice to hold this position of less heat. By such an arrangement, the fingers of the pilot will not become unduly tired in holding this position for a protracted period of time is necessary.

To bring the follower roller 151 into the notch 171 from the trough portion 166 will require twelve pounds of applied counter-clockwise torque at the control knob. This is due to the sharp peak at 167. As soon as the roller has passed over this peak, it will ride inwardly on the surface 170 and bias the cam cluster in the off position wherein the switch So is open.

In moving the control knob 118 in a clockwise direction to move the follower roller 151 out of the groove 171 and return it to the trough 166, nine pounds of applied torque will be required as the roller moves outwardly on the surface 170. In other words it will require nine pounds of applied torque to return the cam cluster from its off position to its position of heat cut off. Since the cam 150 is reversely biased between this latter position of heat cut off and the neutral position, movement of the roller 151 over the peak 167 and subsequent release of the control knob will permit the cam cluster to be automatically moved to its neutral position.

To move the cam cluster from the neutral position in a clockwise direction back to the automatic range of the cluster as previously described will require that the follower 151 ride outwardly on the surface 163. To accomplish this a torque application of nine pounds at the control knob will be required. Thereafter, to move the control knob within this range will require but one pound of torque application as heretofore stated.

Since the biasing cam 150 is symmetrical on opposite sides of the horizontal center line shown in Fig. 1a, the several protuberances representing positions at the cooling side are given the same reference number with a prime exponent. It will be appreciated that in moving the cam cluster in a clockwise direction out of the automatic range a neutral position of the assembly will be encountered, after which the control knob 118 may be manipulated under reverse or yielding counter torque to attain the position of maximum application of hot air at the damper 15 with the switch Sh closed to establish the necessary circuit through the motor winding 16.

With the follower 151 traveling on the peripheral side of the biasing cam opposite the 180° sector illustrated in Fig. 1a, the same conditions of torque application will be required to move the cam cluster through the corresponding positions represented by this side of the biasing cam. Five pounds of applied torque will be required to move the cam cluster from the automatic range to a neutral position preparatory to movement thereof to its position of cold air shut off at the damper 15. Nine pounds of applied torque will be required to bring the cam cluster to this latter position of cold air shut off but only five pounds of torque will be necessary to maintain such position. Twelve pounds of applied torque will be necessary to move the cam cluster from its position of cold air shut off to the off position wherein the follower roller 151 is disposed within the notch 171.

By the arrangement described above it will be seen that with the follower roller 151 operating on either side of the biasing cam 150 the pilot, after a minimum amount of experience in manipulating the control knob 118, will become familiar with its operation and, solely by his sense of feeling, manipulate the knob in a manner necessary to produce intelligent control of the temperature regulating system associated with the aircraft. Torque resistance will be one factor with which he will become acquainted and the general orientation of the control knob will advise him on which side of the biasing cam center line the roller 151 is operating.

We claim:

1. In an electrical control switch of the character described, a rotatable operating shaft mounted for continuous rotational movements in forward and reverse directions to different angular positions to effect predetermined circuit making and circuit breaking functions, a control knob secured to said shaft for applying manual torque to the latter to move the same between said different angular positions, and cam means comprising sloping surfaces of equal inclinations and a spring pressed follower cooperating therewith for normally biasing said shaft in both directions toward one of said positions with equal force when said position is approached by the shaft and comprising other sloping surfaces of unequal inclination cooperating with said follower for biasing said shaft in both directions toward another of said positions with unequal force when said latter position is approached by said shaft.

2. In an electrical control switch of the character described, a rotatable operating shaft mounted for continuous rotational movements in forward and reverse directions to different angular positions to effect predetermined circuit making and circuit breaking functions, a control knob secured to said shaft for applying manual torque to the latter to move the same between said different angular positions, and cam means provided with sloping surfaces of equal inclinations and a spring pressed follower cooperating therewith for normally biasing said shaft in both directions toward one of said positions with equal force when said position is approached by the shaft and also provided with other sloping surfaces of unequal inclinations cooperating with said follower for biasing said shaft in both directions toward another of said positions with unequal force different from said equal force when said latter position is approached by said shaft.

3. In an electrical control switch of the character described, a rotatable operating shaft capable of being moved to different angular positions to effect predetermined circuit making and circuit breaking functions, a control knob secured to said shaft for applying manual torque to the latter to move the same between said positions, a biasing cam secured to said shaft, a spring pressed cam follower engaging said cam, there being a notch formed in the periphery of said cam positioned to receive the follower when said shaft is in one of said positions, portions of the periphery of said cam sloping outwardly at one side of said notch with a predetermined degree of slope to bias the shaft toward said position when the shaft approaches said position in one direction, there being a first trough portion in the periphery of the cam remote from said notch adapted to receive the follower when said shaft is in another of said positions, there being a second trough portion in the periphery of said cam adapted to receive the follower when the shaft is in a third position, the surface of said cam between said trough portions sloping outwardly from said first trough portion toward the second trough portion at a predetermined radial angle, the surface of said cam between said second trough portion and said first mentioned sloping portion of the cam periphery sloping outwardly from the second trough portion at a radial angle greater than said first mentioned sloping portion.

4. A selector switch assembly comprising in combination a rotatable operating shaft mounted for continuous rotational movements in forward or reverse directions, a series of switches positioned along said shaft at spaced regions, a switch operating cam for each of said switches mounted on said shaft, a combined cam follower and switch operating member for each switch positioned to engage a respective cam for actuating the switch associated therewith upon angular turning movements of the cam, a potentiometer having a continuously rotatable operating element connected to said operating shaft for rotation therewith and having a predetermined arcuate operating range, a biasing cam mounted on said operating shaft, and a spring pressed follower cooperating with said biasing cam, the surface of said biasing cam being provided with a series of follower-receiving indentations each establishing an operating position for one of said switches, one of said indentations being formed with a circular arcuate region positioned for engagement with the follower when said potentiometer is in its operating range.

5. A selector switch assembly comprising in combination a rotatable operating shaft mounted for continuous rotational movements in forward or reverse directions, a series of microswitches having movable operating plungers positioned along said shaft at spaced regions, a plunger-operating cam for each plunger mounted on the operating shaft, a potentiometer having a continuously rotatable operating element drivingly connected to said operating shaft and having a predetermined effective range, a biasing cam mounted on said operating shaft, and a spring pressed follower cooperating with said biasing cam, the surface of said biasing cam being provided with a series of follower-receiving indentations each positioned to establish an operating position for one of said microswitches, one of said indentations of said biasing cam being formed with a circular arcuate region positioned for engagement with the follower when the potentiometer is in its operating range, the surfaces of said biasing cam between said arcuate surface thereof and the next adjacent indentations on either side thereof being sloped at equal angles to present, in combination with said follower, a predetermined torque characteristic to the shaft during engagement between either slope and the follower, the slope of the surface of said biasing cam between certain pairs of adjacent indentations being different from the slope of said surface between certain other pairs of adjacent indentations.

6. A selector switch assembly comprising in combination a rotatable operating shaft mounted for continuous rotational movements in forward or reverse directions, a series of microswitches having movable operating plungers positioned along said shaft at spaced regions, a plunger-operating cam for each plunger mounted on the operating shaft, a biasing cam mounted on the operating shaft, and a leaf spring arm and a pressed follower mounted thereon cooperating with said biasing cam to effect different operating positions of the shaft, the surface of said biasing cam being formed with a series of spaced indentations each establishing an operating position for one of said microswitches, the surface of said biasing cam between certain pairs of adjacent indentations being different from the slope of said surface between certain other pairs of adjacent indentations to present different torque characteristics to the shaft during relative movement of the follower on said surface between the various indentations.

7. A selector switch assembly comprising, in combination, a rotatably operable shaft, a series of "microswitches" having movable operable plungers and positioned along said shaft at spaced regions and a spring arm for each said plunger movable into engagement therewith to impart an operative movement thereto, an operating cam on said shaft for each spring arm and means for adjusting the position of each "microswitch" and its plunger with respect to its associated spring arm comprising a fixed support, a shaft extending lengthwise of said support, a supporting arm for each "microswitch" pivotally mounted on the last mentioned shaft, and an adjustable screw engaging each supporting arm and said fixed support for varying the angular position of said supporting arm and the "microswitch" mounted thereon relative to the operating cam associated with such "microswitch."

References Cited in the file of this patent

UNITED STATES PATENTS

| | | |
|---|---|---|
| 1,688,164 | Tarrant | Oct. 16, 1928 |
| 2,003,389 | Petrie | June 4, 1935 |
| 2,128,373 | Mekelburg | Aug. 30, 1938 |
| 2,338,365 | Thorp et al. | Jan. 4, 1944 |
| 2,379,284 | Dimmer | June 26, 1945 |
| 2,398,007 | Hunter | Apr. 9, 1946 |
| 2,423,361 | Wood | July 1, 1947 |
| 2,457,281 | Shannon | Dec. 28, 1948 |
| 2,468,974 | Hammer | May 3, 1949 |
| 2,475,311 | Daly | July 5, 1949 |
| 2,493,190 | Fuchs | Jan. 3, 1950 |
| 2,498,651 | Crom | Feb. 28, 1950 |
| 2,527,249 | Gallagher | Oct. 24, 1950 |
| 2,540,444 | Harland | Feb. 6, 1951 |
| 2,541,299 | Shannon | Feb. 13, 1951 |
| 2,579,169 | Barry | Dec. 18, 1951 |
| 2,616,013 | Greenlee | Oct. 28, 1952 |

FOREIGN PATENTS

| | | |
|---|---|---|
| 968,699 | France | May 3, 1950 |
| 641,135 | Great Britain | Aug. 2, 1950 |
| 680,826 | Great Britain | Oct. 15, 1952 |